US012574812B2

(12) United States Patent
Wang

(10) Patent No.: US 12,574,812 B2
(45) Date of Patent: Mar. 10, 2026

(54) CELL SELECTION METHOD, BROADCAST MESSAGE SENDING METHOD, TERMINAL AND NETWORK DEVICE

(71) Applicant: DATANG MOBILE COMMUNICATIONS EQUIPMENT CO., LTD., Beijing (CN)

(72) Inventor: Da Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 653 days.

(21) Appl. No.: 17/427,621

(22) PCT Filed: Dec. 26, 2019

(86) PCT No.: PCT/CN2019/128532
§ 371 (c)(1),
(2) Date: Jul. 30, 2021

(87) PCT Pub. No.: WO2020/155967
PCT Pub. Date: Aug. 6, 2020

(65) Prior Publication Data
US 2022/0104081 A1 Mar. 31, 2022

(30) Foreign Application Priority Data

Feb. 1, 2019 (CN) ......................... 201910105166.2
Feb. 15, 2019 (CN) ......................... 201910116830.3

(51) Int. Cl.
*H04W 36/00* (2009.01)
*H04W 48/20* (2009.01)

(52) U.S. Cl.
CPC ... *H04W 36/0061* (2013.01); *H04W 36/0077* (2013.01); *H04W 48/20* (2013.01)

(58) Field of Classification Search
CPC ..... H04W 88/06; H04W 88/10; H04W 36/08; H04W 426/0061; H04W 4/023; H04W 48/18; H04W 48/20
See application file for complete search history.

(56) References Cited

U.S. PATENT DOCUMENTS

2011/0306344 A1* 12/2011 Chen ................. H04W 36/0072
455/436
2012/0218922 A1 8/2012 Klingenbrunn et al.
(Continued)

FOREIGN PATENT DOCUMENTS

CN 103404071 A 11/2013
CN 104469870 A 3/2015
(Continued)

OTHER PUBLICATIONS

European Search Report for European Patent Application 19913352.1, issued Feb. 21, 2022.
(Continued)

*Primary Examiner* — Sulaiman Nooristany
(74) *Attorney, Agent, or Firm* — Ladas & Parry, LLP

(57) ABSTRACT

The embodiments of the present disclosure provide a cell selection method, a broadcast message sending method, terminal and a network device, and the method includes: receiving, by a terminal, a broadcast message sent by a network device, where the broadcast message is used to indicate at least one of: whether the network device supports inter-RAT configuration, a mode of inter-RAT configuration supported by the network device, and a resource location of the inter-RAT configuration supported by the network device; performing, by the terminal, cell selection according to the broadcast message, and the cell selection is a cell selection or a cell reselection.

13 Claims, 3 Drawing Sheets

(56) References Cited

U.S. PATENT DOCUMENTS

| | | | | |
|---|---|---|---|---|
| 2013/0223235 A1* | 8/2013 | Hu | .......................... | H04W 36/04 |
| | | | | 370/242 |
| 2017/0111886 A1* | 4/2017 | Kim | ....................... | H04W 72/23 |
| 2018/0092028 A1 | 3/2018 | Miao et al. | | |
| 2018/0220344 A1* | 8/2018 | Shaheen | .................. | H04W 4/60 |
| 2018/0255558 A1 | 9/2018 | Lee et al. | | |
| 2020/0022054 A1* | 1/2020 | Hong | .................... | H04B 17/391 |
| 2020/0045674 A1* | 2/2020 | Tseng | .................... | H04W 76/14 |

FOREIGN PATENT DOCUMENTS

| | | | |
|---|---|---|---|
| CN | 106255181 A | | 12/2016 |
| CN | 109076447 A | | 12/2018 |
| EP | 3291626 A1 | | 3/2018 |
| EP | 3340572 A1 | | 6/2018 |
| EP | 3363130 A1 | | 8/2018 |
| EP | 3567933 A1 | | 11/2019 |
| WO | 2012008957 A1 | | 1/2012 |
| WO | 2015/076925 A1 | | 5/2015 |
| WO | 2017065548 A1 | | 4/2017 |
| WO | 2018084632 A1 | | 5/2018 |
| WO | 2018/190622 A1 | | 10/2018 |

OTHER PUBLICATIONS

European Office Action for the corresponding European Patent Application 19913352.1, issued Apr. 25, 2023.

InterDigital Inc., "Control Plane Aspects for Broadcast NR V2X", R2-1816792, 3GPP RAN WG2 Meeting #104, Spokane, USA, Nov. 12-16, 2018, all pages.

LG Electronics Inc., "Cross-RAT sidelink configuration in MR-DC", R2- 1818424, 3GPP RAN WG2 Meeting #104, Spokane, USA, Nov. 12-16, 2018, all pages.

First Office Action and search report from CN app. No. 201910116830. 3, dated Dec. 16, 2020, with English translation provided by Global Dossier, all pages.

International Search Report from PCT/CN2019/128532, dated Mar. 26, 2020, with English translation from WIPO, all pages.

Written Opinion of the International Searching Authority from PCT/CN2019/128532, dated Mar. 26, 2020, with English translation from WIPO, all pages.

International Preliminary Report on Patentability from PCT/CN2019/128532, dated Jul. 27, 2021, with English translation from WIPO, all pages.

\* cited by examiner

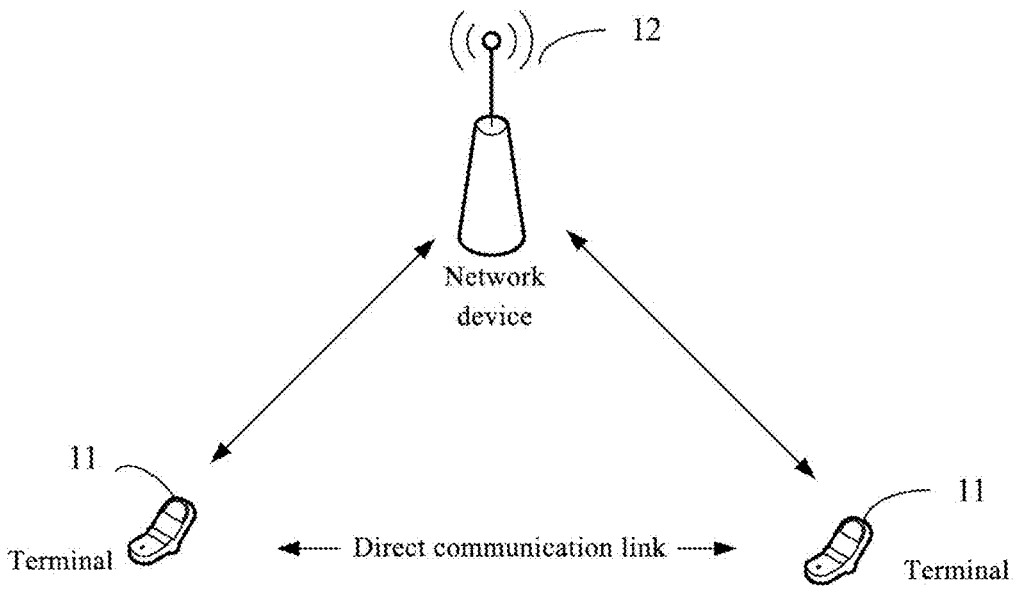
FIG. 1
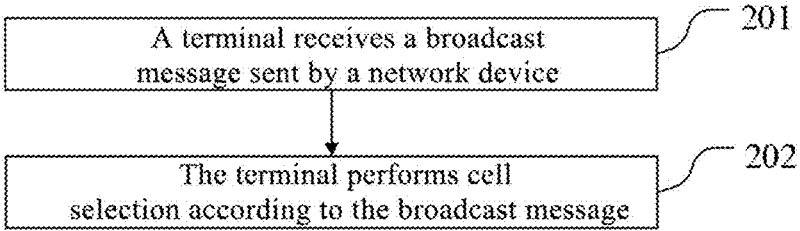
FIG. 2
A network device sends
a broadcast message to a terminal    301
FIG. 3

1

CELL SELECTION METHOD, BROADCAST MESSAGE SENDING METHOD, TERMINAL AND NETWORK DEVICE

CROSS-REFERENCE TO RELATED APPLICATIONS

This application is the U.S. national phase of PCT Application No. PCT/CN2019/128532 filed on Dec. 26, 2019, which claims priority to Chinese Patent Application No. 201910105166.2 filed on Feb. 1, 2019 and to Chinese patent application No. 201910116830.3 filed on Feb. 15, 2019 in China, the disclosures of which are incorporated in their entireties by reference herein.

TECHNICAL FIELD

The present disclosure relates to the technical field of communication, and in particular, to a cell selection method, a broadcast message sending method, a terminal and a network device.

BACKGROUND

In practical applications, a terminal often needs to perform cell selection (including cell initial selection and/or cell reselection). At present, since a network device of a Long Term Evolution (LTE) system can provide cross-carrier configuration, when selecting a cell, the terminal will select according to whether the network device provides cross-carrier configuration, for example, when a resident cell cannot directly provide V2X services, a cell that can provide cross-carrier configuration is preferred. However, the function of the network device in a New Radio (NR) system may be different from the function of the network device in the LTE system. Therefore, if the cell is selected according to the cell selection method in the LTE system, the communication performance of the terminal in the selected cell may be poor.

SUMMARY

Embodiments of the present disclosure provide a cell selection method, a broadcast message sending method, a terminal and a network device to solve the problem of poor communication performance of the terminal.

The embodiments of the present disclosure provide a cell selection method, including:

receiving, by a terminal, a broadcast message sent by a network device, where the broadcast message is used to indicate at least one of: whether the network device supports inter-radio access technology (RAT) configuration, a mode of inter-RAT configuration supported by the network device, and a resource location of the inter-RAT configuration supported by the network device;

performing, by the terminal, cell selection according to the broadcast message, and the cell selection includes a cell initial selection or a cell reselection.

Optionally, a cell priority order includes: a first cell priority order or a second cell priority order.

Optionally, the performing, by the terminal, cell selection according to the broadcast message includes:

performing, by the terminal, cell selection according to the broadcast message based on the priority order of the cell.

Optionally, if the terminal only supports a service of a first system, the cell priority order is the first cell priority order; or, Optionally, if a current service of the terminal is the service of the first system, the cell priority order is the first cell priority order; or, Optionally, if the terminal supports the service of the first system and a service of a second system, the cell priority order is the second cell priority order; or, Optionally, if the current service of the terminal includes the service of the first system and the service of the second system, the cell priority order is the second cell priority order.

Optionally, the first system is a Long Term Evolution (LTE) system, and the second system is a New Radio (NR) system; or the first system is an NR system, and the second system is an LTE system.

a cell that provides a service for cross-carrier configuration of the second system, provides a service for inter-RAT configuration of the first system, and provides only one resource allocation mode for inter-RAT configuration of the first system;

Optionally, if the cell priority order includes a priority having multiple cells, the terminal selects ae cell with a strongest signal strength among the multiple cells.

Optionally, according to the priority order of the cells, if there is no selectable cell, the terminal uses a pre-configured resource to perform services.

The embodiments of the present disclosure further provide a broadcast message sending method, including:

sending, by a network device, a broadcast message to a terminal, where the broadcast message is used to indicate at least one of: whether the network device supports an inter-RAT configuration, a mode of inter-RAT configuration supported by the network device, and a resource location of the inter-RAT configuration supported by the network device;

The embodiments of the present disclosure further provide a terminal, including:

a receiving module, configured to receive a broadcast message sent by a network device, where the broadcast message is used to indicate at least one of: whether the network device supports inter-radio access technology (RAT) configuration, a mode of inter-RAT configuration supported by the network device, and a resource location of the inter-RAT configuration supported by the network device;

a selecting module, configured to perform cell selection according to the broadcast message, and the cell selection includes a cell initial selection or a cell reselection.

Optionally, the selecting module is configured to perform cell selection according to the broadcast message based on a cell priority order.

Optionally, if the terminal only supports a service of a first system, the cell priority order is a first cell priority order; or, the network device supports inter-RAT configuration, a mode of inter-RAT configuration supported by the network device, and a resource location of the inter-RAT configuration supported by the network device; and is configured to perform cell selection according to the broadcast message, and the cell selection includes a cell initial selection or a cell reselection;

or, the transceiver is configured to receive a broadcast message sent by a network device, where the broadcast message is used to indicate at least one of: whether the network device supports inter-RAT configuration, a mode of inter-RAT configuration supported by the network device, and a resource location of the inter-RAT configuration supported by the network device;

the processor is configured to perform cell selection according to the broadcast message, and the cell selection includes a cell initial selection or a cell reselection.

Optionally, the performing cell selection according to the broadcast message includes:

performing cell selection according to the broadcast message based on a cell priority order.

Optionally, if the terminal only supports a service of a first system, the cell priority order is a first cell priority order; or, Optionally, if a current service of the terminal is the service of the first system, the cell priority order is the first cell priority order; or, Optionally, if the terminal supports the service of the first system and a service of a second system, the cell priority order is a second cell priority order; or, Optionally, if the current service of the terminal includes the service of the first system and the service of the second system, the cell priority order is the second cell priority order.

Optionally, the first cell priority order includes at least two of the following cells:

a first cell, a second cell, a third cell, and a fourth cell;

a service for inter-RAT configuration of the first system, and provides only one resource allocation mode for inter-RAT configuration of the first system;

Optionally, a priority of a fifth cell is higher that a priority of a sixth cell in the second cell priority order.

where, a priority order of at least one cell included in the fifth cell is specified by a standard, or configured by a network device, or pre-configured;

a priority order of at least one cell included in the sixth cell is specified by a standard, or configured by a network device, or pre-configured;

The embodiments of the present disclosure further provide a network device, including: a transceiver, a memory, a processor, and a program stored on the memory and executable on the processor, the transceiver is configured to send a broadcast message to a terminal, where the broadcast message is used to indicate at least one of: whether the network device supports inter-RAT configuration, a mode of inter-RAT configuration supported by the network device, and a resource location of the inter-RAT configuration supported by the network device;

The embodiments of the present disclosure further provide a computer readable storage medium, where a computer program is stored in the computer readable storage medium, when the computer program is executed by a processor, the steps of the cell selection method provided by the embodiments of the present disclosure are implemented, or, when the computer program is executed by a processor, the steps of the broadcast message sending method provided by the embodiments of the present disclosure are implemented.

In the embodiments of the present disclosure, a terminal receives a broadcast message sent by a network device, where the broadcast message is used to indicate at least one of: whether the network device supports inter-RAT configuration, a mode of inter-RAT configuration supported by the network device, and a resource location of the inter-RAT configuration supported by the network device; and the terminal performs cell selection according to the broadcast message, and the cell selection includes a cell initial selection or a cell reselection. In this way, the terminal can select a cell according to the RAT configuration, so that a cell that better meets the needs of the terminal can be selected to improve the communication performance of the terminal.

BRIEF DESCRIPTION OF THE DRAWINGS

FIG. 1 is a schematic view of a network structure applicable to an embodiment of the present disclosure;

FIG. 2 is a flowchart of a cell selection method according to an embodiment of the present disclosure;

FIG. 3 is a flowchart of a broadcast message sending method according to an embodiment of the present disclosure;

DETAILED DESCRIPTION

Figure 4:
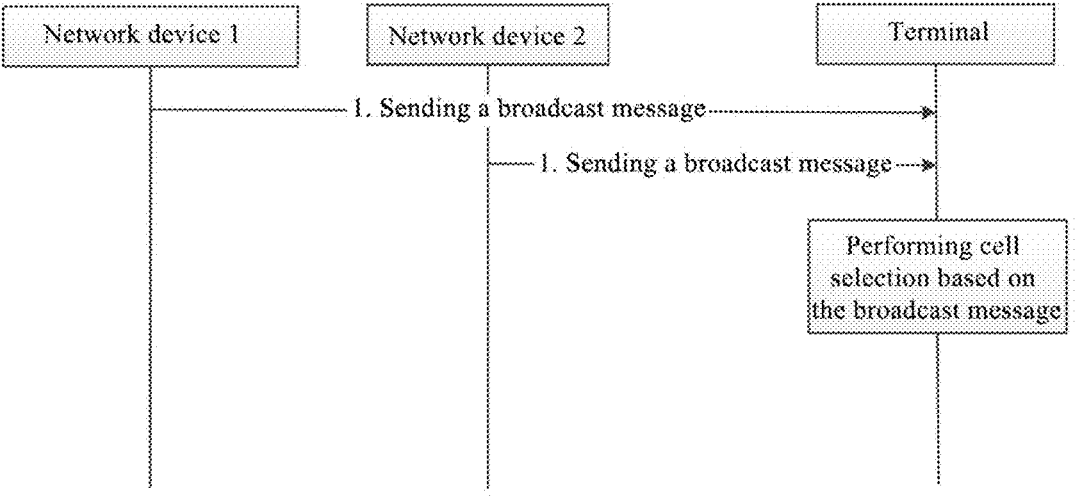
FIG. 4 is a schematic view of a cell selection method according to an embodiment of the present disclosure.

In order that objects, technical solutions, and advantages of the present disclosure become more apparent, a detailed description will be made as below in conjunction with the accompanying drawings and specific embodiments.

In order that objects, technical solutions, and advantages of the present disclosure become more apparent, a detailed description will be made as below in conjunction with the accompanying drawings and specific embodiments.

Referring to FIG. 1 which is a schematic view of a network structure applicable to the embodiments of the present disclosure, and as shown in FIG. 1, the network structure includes a plurality of terminals 11 and a network device 12, where the terminal 11 may be a User Equipment (UE) or other terminal devices, for example: terminal side devices such as a Mobile phone, a Tablet Personal Computer (Tablet Personal Computer), a Laptop Computer (Laptop Computer), a Personal Digital Assistant (PDA), a Mobile Internet Device (MID), an on-vehicle device or a Wearable Device (Wearable Device), it should be noted that specific types of terminals are not limited in the embodiments of the present disclosure. The terminals 11 can perform direct communication (or called direct connection communication) through a direct communication interface, where a direct communication link can be called Sidelink (translated as a direct communication link or bypass), and a corresponding interface of Sidelink is called Direct communication interface. Terminals in direct communications may be all on-network or off-network; or part of the devices are on-network and other part of the devices are off-network. The so-called on-network means that the devices participating in direct communication are located within a coverage of a 3GPP base station communication carrier, and the so-called off-network means that the devices participating in direct communication are not within the coverage of the 3GPP base station communication carrier. The network device 12 may be a base station, for example: macro station, LTE eNB, 5G NR NB, and the like; the network device may also be a small station, such as a Low Power Node (Low Power Node, LPN), pico, femto, or the network device may be an Access Point (Access Point, AP); the base station may also be a network node composed of a Central Unit (Central Unit,

5

CU) and a plurality of Distributed Units (Distributed Unit, DU) managed and controlled by it. It should be noted that, in the embodiments of the present disclosure, the specific type of the network device is not limited. It should be noted that, in the embodiments of the present disclosure, the specific type of the network device is not limited.

Please refer to FIG. 2, FIG. 2 is a flowchart of a cell selection method provided by the embodiments of the present disclosure, as shown in FIG. 2, the method includes the following steps:

201, a terminal receives a broadcast message sent by a network device, where the broadcast message is used to indicate at least one of: whether the network device supports inter-RAT configuration, a mode of inter-RAT configuration supported by the network device, and a resource location of the inter-RAT configuration supported by the network device;

202, the terminal performs cell selection according to the broadcast message, and the cell selection includes a cell initial selection or a cell reselection.

Where the step 201 may be receiving a broadcast message sent by one or more network devices, and the broadcast message of each network device is used to indicate at least one of: whether the network device supports inter-RAT configuration, a mode of inter-RAT configuration supported by the network device, and a resource location of the inter-RAT configuration supported by the network device.

It should be noted that whether the network device supports inter-RAT configuration can be understood as whether a cell corresponding to the network device supports inter-RAT configuration, and the mode of inter-RAT configuration supported by the network device can be understood as a mode of inter-RAT configuration supported by a cell corresponding to the network device, the resource location of the inter-RAT configuration supported by the network device can be understood as a resource location of the inter-RAT configuration supported by a cell corresponding to the network device.

In addition, when the mode of the inter-RAT configuration supported by the network device is indicated in the broadcast message, it can be defaulted that the network device supports the inter-RAT configuration, and when the resource location of the inter-RAT configuration supported by the network device is indicated in the broadcast message, it can be defaulted that the network device supports the inter-RAT configuration.

In an optional implementation, the above broadcast message includes one or more of the following fields:

Option 1: a field indicating whether inter-RAT configuration is supported;

For example, this field is N bits, and N is a positive integer greater than or equal to 1. Specifically, it can be 1 bit, and when the value is 0, it means inter-RAT configuration is not supported, and when it is 1, it means inter-RAT configuration is supported.

Option 2: a field indicating a resource allocation mode of the inter-RAT configuration;

for example, this field is M bits, M is a positive integer greater than or equal to 1, specifically, it can be 2 bits. When the value is 11, it means that all resource allocation modes are supported. When the value is 01 or 10, it means that only one of the resource allocation modes is supported, for example, 01 means that only a resource allocation mode selected by the terminal is supported, 10 means that only a resource allocation mode scheduled by the network is supported, and when the value is 00, it means that no resource allocation mode of the inter-RAT configuration is supported, which means that the inter-RAT configuration is not supported.

Option 3: a field indicating the resource location of the inter-RAT configuration;

This field indicates the resource location of another RAT of the inter-RAT configuration. For example, a base station of NR indicates a location of an LTE V2X resource (for example: resource pool configuration, etc.). If this field exists, it indicates that the inter-RAT configuration is supported, and a specific supported allocation mode can be specifically indicated or it is defaulted that only a resource allocation mode selected by the terminal is supported, because this field has been configured with a relevant resource pool location. If this field does not exist, it indicates that the inter-RAT configuration is not supported, that is, it is implicitly indicated that the inter-RAT configuration is not supported.

It should be noted that the above-mentioned performing cell selection according to the broadcast message may be performing cell selection according to the broadcast message and combined with other information of the network device, for example: combined with a service supported by the network device, or combined with information such as whether the network device supports cross-carrier configuration, etc. Among them, the information can be sent to the terminal by the network device, or measured by the terminal, or pre-configured, etc., which is not limited. Of course, in some implementations, cell selection can also be performed only based on the above-mentioned broadcast message, which is not limited.

In the embodiments of the present disclosure, through the above steps, it can be realized that the network sends a broadcast message, where the broadcast message indicates at least one of: whether the network device supports inter-RAT configuration, a mode of inter-RAT configuration supported by the network device, and a resource location of the inter-RAT configuration supported by the network device. The terminal receives the broadcast message sent by the network device, and performs cell selection according to the broadcast message. In this way, the terminal can select a cell according to the RAT configuration, so that a cell that better meets the needs of the terminal can be selected to improve the communication performance of the terminal. In addition, due to the NR system, in addition to supporting the cross-carrier configuration, network device can also support the inter-RAT configuration, and the services supported by the terminal are also richer. In this way, the cell selection method provided by the embodiments of the present disclosure can solve the problem of how the terminal performs cell selection, so that the terminal device can select a suitable cell to improve the communication performance of the terminal.

As an Optional implementation, the performing, by the terminal, cell selection according to the broadcast message includes:

performing, by the terminal, cell selection according to the broadcast message based on the priority order of the cell.

Where the cell priority order may be pre-configured, or agreed in a protocol, or configured by the network side.

The performing, by the terminal, cell selection according to the broadcast message based on a priority order of the cell may be that the terminal determines a cell type according to the broadcast message, and determines a priority of each cell type according to the cell priority order.

Optionally, if the cell priority order includes a priority having multiple cells, the terminal selects a cell with a strongest signal strength among the multiple cells or randomly selects a cell. That is, when multiple cells are included in the highest priority among the cells for the terminal to select, the terminal may select the cell with the strongest signal strength among the multiple cells or randomly select one. Of course, the embodiments of the present disclosure are not limited thereto. For example, the terminal may select a cell by itself, for example, the terminal may select a cell according to a rule set by itself, that is, cell selection is implemented by the terminal.

Optionally, according to the priority order of the cells, if there is no selectable cell, the terminal uses a pre-configured resource to perform services.

For example, if there is no selectable cell, the terminal considers it to be off-network, and uses the pre-configured resource to perform a V2X service. Specifically, it can be performing transmission of the service to improve the communication performance of the terminal in the off-network state.

It should be noted that the above cell priority order can include multiple cells, but in actual applications, a quantity of cells for the terminal to select may be less than a quantity of cells in the cell priority order. Then, the terminal can select a cell with a highest priority among the cells for the terminal to select during the selection process.

In this implementation, since the cell selection is performed according to the above-mentioned priority order of cells, a cell that better meets the needs of the terminal can be selected, so that the communication performance of the terminal can be further improved.

It should be noted that, in order to describe the technical solution more clearly, taking the Long Term Evolution (Long Term Evolution, LTE) system and the New Radio (NR) system as examples, the types of cells can be divided as follows:

a) the LTE V2X service is directly provided, the cross-carrier configuration is not provided, the inter-RAT configuration is not provided either;

b) the LTE V2X service of the cross-carrier configuration is provided, but the inter-RAT configuration is not provided;

c) the LTE V2X service is directly provided, the cross-carrier configuration is not provided, but NR mode 1 or mode 2 of the inter-RAT configuration is provided;

d) the LTE V2X service is directly provided, the cross-carrier configuration is not provided, but NR mode 1 and mode 2 of the inter-RAT configuration are provided;

e) the LTE V2X service of the inter-RAT configuration is provided, and LTE mode 3 or mode 4 of the inter-RAT configuration is provided;

f) the LTE V2X service of the cross-carrier configuration is provided, and LTE mode 3 and mode 4 of the inter-RAT configuration is provided;

g) the LTE V2X service of the cross-carrier configuration is provided, and NR mode 1 or mode 2 of the inter-RAT configuration is provided;

h) the LTE V2X service of the cross-carrier configuration is provided, and NR mode 1 and mode 2 of the inter-RAT configuration are provided;

i) the NR V2X service is directly provided, the cross-carrier configuration is not provided, the inter-RAT configuration is not provided either;

j) the NR V2X service of the cross-carrier configuration is provided, but the inter-RAT configuration is not provided;

k) the NR V2X service is directly provided, the cross-carrier configuration is not provided, but LTE mode 3 or mode 4 of the inter-RAT configuration is provided;

l) the NR V2X service is directly provided, the cross-carrier configuration is not provided, but LTE mode 3 and mode 4 of the inter-RAT configuration are provided;

m) the NR V2X service of the inter-RAT configuration is provided, and NR mode 1 and mode 2 of the inter-RAT configuration is provided;

n) the NR V2X service of the inter-RAT configuration is provided, and NR mode 1 and mode 2 of the inter-RAT configuration is provided;

o) the NR V2X service of the cross-carrier configuration is provided, and LTE mode 3 or mode 4 of the inter-RAT configuration is provided;

p) the NR V2X service of the cross-carrier configuration is provided, and LTE mode 3 and mode 4 of the inter-RAT configuration are provided.

Where, the above-mentioned NR mode1 may be a resource allocation mode scheduled by the network in the direct connection communication of the NR system, the above-mentioned NR mode 2 may be a resource allocation mode selected by the terminal in the direct connection communication of the NR system; LTE mode 3 may be a resource allocation mode scheduled by the network in the LTE system, that is, a resource allocation mode in which the network allocates resources to the terminal according to the direct communication link (Sidelink) buffer status reporting (BSR) reported by the terminal; LTE mode 4 may be a resource allocation mode selected by the terminal in the LTE system, that is, the terminal selects a resource from pre-configured or network broadcast transmission resources for transmission on the direct communication link.

It should be noted that the above multiple cells are just examples. In practical applications, the communication system may not support all the above cell types, and some types of cells may not be supported, such as cell type d or h, because it is more difficult to support inter-RAT dynamic configuration.

Optionally, a cell priority order includes: a first cell priority order or a second cell priority order.

Where the above-mentioned first cell priority order or the second cell priority order may be selected by the terminal itself, or configured by the network side, or pre-configured, etc.

Further, if the terminal only supports a service of a first system, the cell priority order is the first cell priority order; or, if a current service of the terminal is the service of the first system, the cell priority order is the first cell priority order; or, if the terminal supports the service of the first system and a service of a second system, the cell priority order is a second cell priority order; or, if the current service of the terminal includes the service of the first system and the service of the second system, the cell priority order is the second cell priority order.

In one method, the first system is a Long Term Evolution (LTE) system, and the second system is a New Radio (NR) system. In another method, the first system is an NR system, and the second system is an LTE system.

It should be noted that a first priority order when the first system is the LTE system may be different from a first cell priority order when the first system is the NR system.

In addition, the above-mentioned service is a vehicle-to-everything (V2X) service. For example, the service of the first system can be called LTE V2X service or NR V2X service, or the service of the second system can be called LTE V2X service or NR V2X service. It should be noted that in the embodiments of the present disclosure, it is not limited that, for example, the above-mentioned services may also be other services that use direct communication.

Optionally, the first cell priority order includes at least two of the following cells:

a first cell, a second cell, a third cell, and a fourth cell;

where, a priority of the first cell is higher than a priority of the second cell, a priority of the third cell and a priority of the fourth cell, and the priority of the second cell is higher than or equal to the priority of the third cell and the priority of the fourth cell, the priority of the third cell is higher than or equal to the priority of the fourth cell;

the first cell is a cell that provides the service of the first system;

the second cell is a cell that provides a service for cross-carrier configuration of the first system;

the third cell is a cell that provides a service of the second system and provides an inter-RAT configuration, and provides multiple resource allocation modes for inter-RAT configuration of the first system, or the third cell is a cell that provides a service for inter-RAT configuration of the first system, and provides multiple resource allocation modes for inter-RAT configuration of the first system;

the fourth cell is a cell that provides a service of the second system and provides an inter-RAT configuration, and provides one resource allocation mode for inter-RAT configuration of the first system, or the third cell is a cell that provides a service for inter-RAT configuration of the first system, and provides one resource allocation mode for inter-RAT configuration of the first system;

or, the first cell is a cell that provides the service of the first system;

the second cell is a cell that provides a service of the second system and provides an inter-RAT configuration, and provides multiple resource allocation modes for inter-RAT configuration of the first system, or, the second cell is a cell that provides a service for inter-RAT configuration of the first system, and provides multiple resource allocation modes for inter-RAT configuration of the first system;

the third cell is a cell that provides a service for cross-carrier configuration of the first system;

the fourth cell is a cell that provides a service of the second system and provides an inter-RAT configuration, and provides only one resource allocation mode for inter-RAT configuration of the first system, or, the fourth cell is a cell that provides a service for inter-RAT configuration of the first system, and provides only one resource allocation mode for inter-RAT configuration of the first system;

It should be noted that the above providing the service of the first system may mean providing the service of the first system directly. For example, the first cell is a cell that can directly provide the V2X service of the first system, that is, a carrier of the first cell can provide the V2X service of the first system.

The above-mentioned cell that provides the service for cross-carrier (cross-carrier) configuration of the first system may be a cell that cannot directly provide the service of the first system, and a carrier that can provide the V2X service needs to be configured or indicated, that is, a carrier that can provide the V2X service is cross-carrier configured, that is, the service of the first system is configured through cross-carrier configuration.

The above-mentioned cell that provides multiple resource allocation modes for inter-RAT configuration of the first system may be a cell that cannot directly provide the resource allocation mode of the first system, and configures the multiple resource allocation modes of the first system through inter-RAT configuration.

The above-mentioned cell that provides only one resource allocation mode for inter-RAT configuration of the first system may be a cell that cannot directly provide the resource allocation mode of the first system and configures one resource allocation mode of the first system through inter-RAT configuration In this implementation, through the above priority order, the terminal can select the most suitable cell.

It should be noted that the above-mentioned first cell, second cell, third cell, and fourth cell refer to cell types, and there may be one or more cells in a same type.

Explanation will be given hereinafter by taking an example in which the first system is the LTE system and the service is the V2X service:

When the terminal equipment only supports the LTE V2X service, the priority of the cell selection/reselection is as follows: (Note: If there are multiple cells meeting conditions in a same priority, the terminal device selects the cell with the strongest signal strength, or randomly select a cell, or selecting which cell belongs to the terminal device implementation)

Solution I: a possible priority of cell selection is as follows:

i. a cell that provides the LTE V2X service;

ii. a cell that provides the LTE V2X service of the cross-carrier configuration;

iii. a cell that provides the NR V2X service, provides the LTE V2X service of the inter-RAT configuration, and provides LTE mode3 and mode4 of the inter-RAT configuration (regardless of whether it supports cross-carrier configuration), or a cell provides the LTE V2X service of the inter-RAT configuration, and provides LTE mode3 and mode4 of the inter-RAT configuration (regardless of whether it supports the NR V2X service);

iv. a cell that provides the NR V2X service, provides the LTE V2X service of the inter-RAT configuration, and only provides LTE mode3 or LTE mode4 of the inter-RAT configuration (regardless of whether it supports cross-carrier configuration), or a cell provides the LTE V2X service of the inter-RAT configuration, and only provides LTE mode3 or LTE mode4 of the inter-RAT configuration (regardless of whether it supports the NR V2X service).

The main reason: firstly, the cell that provides the LTE service is selected, and then the cell that provides the LTE service of the cross-carrier configuration is selected, secondly, the cell that provides the NR service and supports the configuration of all LTE V2X resource allocation modes is selected, or the cell that provides inter-RAT configuration of all LTE V2X resource allocation modes is selected, finally the cell that provides the NR service and only configures the LTE V2X resource allocation mode 3 or mode 4, or the cell that only provides the inter-RAT configuration of LTE V2X resource allocation mode 3 or mode 4 is selected.

Solution II: another possible priority of cell selection is as follows:

i. a cell that provides the LTE V2X service;

ii. a cell that provides the NR V2X service, provides the LTE V2X service of the inter-RAT configuration, and provides LTE mode3 and mode4 of the inter-RAT configuration (regardless of whether it supports cross-carrier configuration), or a cell provides the LTE V2X service of the inter-RAT configuration, and provides LTE mode3 and mode4 of the inter-RAT configuration (regardless of whether it supports the NR V2X service);

iii. a cell that provides the LTE V2X service of the cross-carrier configuration;

iv. a cell that supports the NR V2X service, provides the LTE V2X service of the inter-RAT configuration, and only provides LTE mode3 or LTE mode4 of the inter-RAT configuration (regardless of whether it supports cross-carrier configuration), or a cell that provides the LTE V2X service of the inter-RAT configuration, and only provides LTE mode3 or LTE mode4 of the inter-RAT configuration (regardless of whether it supports the NR V2X service).

The main reason: firstly, the cell that provides the LTE service is selected, and then the cell that provides the NR service and supports the configuration of all LTE V2X resource allocation modes is selected, or the cell that provides inter-RAT configuration of all LTE V2X resource allocation modes is selected, secondly, the cell that provides the LTE service of the cross-carrier configuration is selected, finally the cell that provides the NR service and only configures the LTE V2X resource allocation mode 3 or mode 4, or the cell that only provides the inter-RAT configuration of LTE V2X resource allocation mode 3 or mode 4 is selected.

Explanation will be given hereinafter by taking an example in which the first system is the NR system and the service is the V2X service:

When the terminal equipment only supports the NR V2X service, the priority of the cell selection/reselection is as follows: (Note: If there are multiple cells meeting conditions in a same priority, the terminal device selects the cell with the strongest signal strength, or randomly select a cell, or selecting which cell belongs to the terminal device implementation)

Solution I: a possible priority of cell selection is as follows:

i. a cell that provides the NR V2X service;

ii. a cell that provides the NR V2X service of the cross-carrier configuration;

iii. a cell that provides the LTE V2X service, provides the NR V2X service of the inter-RAT configuration, and provides NR mode 1 and mode 2 of the inter-RAT configuration (regardless of whether it supports cross-carrier configuration), or a cell that provides the NR V2X service of the inter-RAT configuration, and provides NR mode 1 and mode 2 of the inter-RAT configuration (regardless of whether it supports the LTE V2X service);

iv. a cell that provides the LTE V2X service, provides the NR V2X service of the inter-RAT configuration, and provides NR mode 1 or NR mode 2 of the inter-RAT configuration (regardless of whether it supports cross-carrier configuration), or a cell that provides the NR V2X service of the inter-RAT configuration, and only provides NR mode 1 or NR mode 2 of the inter-RAT configuration (regardless of whether it supports the LTE V2X service).

The main reason: firstly, the cell that provides the NR service is selected, and then the cell that provides the NR service of the cross-carrier configuration is selected, secondly, the cell that provides the LTE service, provides the NR service of the inter-RAT configuration and provides the inter-RAT configuration of all NR V2X resource allocation modes is selected, or the cell that provides inter-RAT configuration of all NR V2X resource allocation modes is selected, finally the cell that provides the LTE service and provides the NR V2X service of the inter-RAT configuration, and only provides the inter-RAT configuration of NR V2X resource allocation mode 1 or mode 2, or the cell that only provides the inter-RAT configuration of NR V2X resource allocation mode 1 or mode 2 is selected.

Solution II: another possible priority of cell selection is as follows:

i. a cell that provides the NR V2X service;

ii. a cell that provides the LTE V2X service, provides the NR V2X service of the inter-RAT configuration, and provides NR mode1 and mode2 of the inter-RAT configuration (regardless of whether it supports cross-carrier configuration), or a cell that provides the NR V2X service of the inter-RAT configuration, and provides NR mode 1 and mode 2 of the inter-RAT configuration (regardless of whether it supports the LTE V2X service);

iii. a cell that provides the NR V2X service of the cross-carrier configuration;

iv. a cell that provides the LTE V2X service, provides the NR V2X service of the inter-RAT configuration, and provides NR mode 1 or NR mode 2 of the inter-RAT configuration (regardless of whether it supports cross-carrier configuration), or a cell that provides the NR V2X service of the inter-RAT configuration, and only provides NR mode 1 or NR mode 2 of the inter-RAT configuration (regardless of whether it supports the LTE V2X service).

The main reason: firstly, the cell that provides the NR service is selected, and then the cell that provides the LTE service, provides the NR service of the inter-RAT configuration and provides the inter-RAT configuration of all NR V2X resource allocation modes is selected, or the cell that provides inter-RAT configuration of all NR V2X resource allocation modes is selected, secondly, the cell that provides the NR service of the cross-carrier configuration is selected, finally the cell that provides the LTE service and provides the NR V2X service of the inter-RAT configuration, and only provides the inter-RAT configuration of NR V2X resource allocation mode 1 or mode 2, or the cell that only provides the inter-RAT configuration of NR V2X resource allocation mode 1 or mode 2 is selected.

Optionally, a priority of a fifth cell is higher that a priority of a sixth cell in the second cell priority order.

where, a priority order of at least one cell included in the fifth cell is specified by a standard, or configured by a network device, or pre-configured;

a priority order of at least one cell included in the sixth cell is specified by a standard, or configured by a network device, or pre-configured;

It should be noted that the fifth cell and the sixth cell refer to cell types, and the fifth cell and the sixth cell may refer to one or more cell types, that is, the fifth cell and the sixth cell include at least one cell means to include at least one cell type, and the priority order of the one or more cell types is specified by a standard, or configured by a network device, or pre-configured. That is, the priority order in the fifth cell and the sixth cell can be exchanged, which is specified by the standard, or configured by the network device, or pre-configured, but the priority of any cell in the fifth cell is higher than that of all the cells in the sixth cell.

Optionally, the fifth cell includes at least one of the following:

a cell that provides the services of the first system and the second system;

a cell that provides the service of the first system;

a cell that provides the service of the second system.

It should be noted that the priority order of the cell included in the sixth cell can be exchanged, which is specifically specified by a standard, or configured by a network device, or pre-configured. In addition, the priorities of some or all of the cells in the fifth cell may be configured the same or different. For example, the priorities of the cell that provides the service of the first system and the cell that provides the service of the second system are the same, and the priorities of the cell that provides the service of the first system and the second system is higher than the two cells, of course, this is not limited, for example: the priority of the cell that provides the service of the first system may be higher than the priority of the cell that provides the service of the second system, or the priority of the cell that provides the service of the second system may be higher than the priority of the cell that provides the service of the first system, or the priority of the cell that provides the service of the first system may be equal to the priority of the cell that provides the service of the second system.

The sixth cell may include at least one of the following:

a cell that provides the services for cross-carrier configuration of the first system and the second system;

a cell that provides a service for cross-carrier configuration of the first system;

a cell that provides a service for cross-carrier configuration of the second system;

a cell that provides a service for inter-RAT configuration of the first system, and provides multiple resource allocation modes for inter-RAT configuration of the first system;

a cell that provides a service for inter-RAT configuration of the first system, and provides only one resource allocation mode for inter-RAT configuration of the first system;

a cell that provides a service for inter-RAT configuration of the second system, and provides multiple resource allocation modes for inter-RAT configuration of the second system;

a cell that provides a service for inter-RAT configuration of the second system, and provides only one resource allocation mode for inter-RAT configuration of the second system;

a cell that provides a service of the first system, provides a service for inter-RAT configuration of the second system, and provides multiple resource allocation modes for inter-RAT configuration of the second system;

a cell that provides a service of the first system, provides a service for inter-RAT configuration of the second system, and provides only one resource allocation mode for inter-RAT configuration of the second system;

a cell that provides a service of the second system, provides a service for inter-RAT configuration of the first system, and provides multiple resource allocation modes for inter-RAT configuration of the first system;

a cell that provides a service of the second system, provides a service for inter-RAT configuration of the first system, and provides only one resource allocation mode for inter-RAT configuration of the first system;

a cell that provides a service for cross-carrier configuration of the first system, provides a service for inter-RAT configuration of the second system, and provides multiple resource allocation modes for inter-RAT configuration of the second system;

a cell that provides a service for cross-carrier configuration of the first system, provides a service for inter-RAT configuration of the second system, and provides only one resource allocation mode for inter-RAT configuration of the second system;

a cell that provides a service for cross-carrier configuration of the second system, provides a service for inter-RAT configuration of the first system, and provides multiple resource allocation modes for inter-RAT configuration of the first system;

a cell that provides a service for cross-carrier configuration of the second system, provides a service for inter-RAT configuration of the first system, and provides only one resource allocation mode for inter-RAT configuration of the first system;

It should be noted that the priority order of the cell included in the sixth cell may be exchanged, which is specifically specified by a standard, or configured by a network device, or pre-configured; In addition, the priorities of some or all of the cells in the sixth cell may be configured the same or different. For example, the priorities of the cell that provides the service for cross-carrier configuration of the first system and the cell that provides the service for cross-carrier configuration of the second system are the same, and the priority of the cell that provides the service for cross-carrier configuration of the first system and the service for cross-carrier configuration of the second system is higher than the cell that provides the service for cross-carrier configuration of the first system and the cell that provides the service for cross-carrier configuration of the second system.

It should also be noted that in practical applications, it does not necessarily include all cells in the fifth cell and the sixth cell. For example, it may include some of the cells in the fifth cell and the sixth cell, but the priorities of these cells are still in accordance with the priority determined in the above second priority order.

Explanation will be given hereinafter by taking an example in which the first system is the LTE system, the second system is the NR system and the service is the V2X service:

When the terminal device supports the LTE V2X service and the NR V2X service, i.e., the two services are both supported, the priority of the cell selection/reselection is as follows: (Note: If there are multiple cells meeting conditions in a same priority, the terminal device selects the cell with the strongest signal strength, or randomly select a cell, or selecting which cell belongs to the terminal device implementation)

Solution I: a possible priority of cell selection may be arranged in the following order (that is, the higher the priority is in the front):

a cell that provides the LTE V2X and NR V2X;

a cell that provides the LTE V2X;

a cell that provides the NR V2X;

a cell that provides cross-carrier configuration of the LTE V2X and the NR V2X;

a cell that provides cross-carrier configuration of the LTE V2X;

a cell that provides cross-carrier configuration of the NR V2X;

a cell that provides inter-RAT configuration of the LTE V2X, and provides multiple resource allocation modes for inter-RAT configuration of the LTE;

a cell that provides inter-RAT configuration of the LTE V2X, and provides only one resource allocation mode for inter-RAT configuration of the LTE;

a cell that provides inter-RAT configuration of the NR V2X, and provides multiple resource allocation modes for inter-RAT configuration of the NR;

a cell that provides inter-RAT configuration of the NR V2X, and provides only one resource allocation mode for inter-RAT configuration of the NR;

a cell that provides the LTE V2X, provides inter-RAT configuration of the NR V2X, and provides multiple resource allocation modes for inter-RAT configuration of the NR;

a cell that provides the LTE V2X, provides inter-RAT configuration of the NR V2X, and provides only one resource allocation mode for inter-RAT configuration of the NR;

a cell that provides the NR V2X, provides inter-RAT configuration of the LTE V2X, and provides multiple resource allocation modes for inter-RAT configuration of the LTE;

a cell that provides the NR V2X, provides inter-RAT configuration of the LTE V2X, and provides only one resource allocation modes for inter-RAT configuration of the LTE;

a cell that provides cross-carrier configuration of the LTE V2X, provides inter-RAT configuration of the NR V2X, and provides multiple resource allocation modes for inter-RAT configuration of the NR;

a cell that provides cross-carrier configuration of the LTE V2X, provides inter-RAT configuration of the NR V2X, and provides only one resource allocation mode for inter-RAT configuration of the NR;

a cell that provides cross-carrier configuration of the NR V2X, provides inter-RAT configuration of the LTE V2X, and provides multiple resource allocation modes for inter-RAT configuration of the LTE;

a cell that provides cross-carrier configuration of the NR V2X, provides inter-RAT configuration of the LTE V2X, and provides only one resource allocation mode for inter-RAT configuration of the LTE;

Solution II: a possible priority of cell selection may be arranged in the following order (that is, the higher the priority is in the front):

a cell that provides the LTE V2X and NR V2X;

a cell that provides the NR V2X;

a cell that provides the LTE V2X;

a cell that provides cross-carrier configuration of the LTE V2X and the NR V2X;

a cell that provides cross-carrier configuration of the NR V2X;

a cell that provides cross-carrier configuration of the LTE V2X;

a cell that provides inter-RAT configuration of the NR V2X, and provides multiple resource allocation modes for inter-RAT configuration of the NR;

a cell that provides inter-RAT configuration of the NR V2X, and provides only one resource allocation mode for inter-RAT configuration of the NR;

a cell that provides inter-RAT configuration of the LTE V2X, and provides multiple resource allocation modes for inter-RAT configuration of the LTE;

a cell that provides inter-RAT configuration of the LTE V2X, and provides only one resource allocation mode for inter-RAT configuration of the LTE; a cell that provides the NR V2X, provides inter-RAT configuration of the LTE V2X, and provides multiple resource allocation modes for inter-RAT configuration of the LTE;

a cell that provides the NR V2X, provides inter-RAT configuration of the LTE V2X, and provides only one resource allocation mode for inter-RAT configuration of the LTE;

a cell that provides the LTE V2X, provides inter-RAT configuration of the NR V2X, and provides multiple resource allocation modes for inter-RAT configuration of the NR;

a cell that provides the LTE V2X, provides inter-RAT configuration of the NR V2X, and provides only one resource allocation mode for inter-RAT configuration of the NR;

a cell that provides cross-carrier configuration of the NR V2X, provides inter-RAT configuration of the LTE V2X, and provides multiple resource allocation modes for inter-RAT configuration of the LTE;

a cell that provides cross-carrier configuration of the NR V2X, provides inter-RAT configuration of the LTE V2X, and provides only one resource allocation mode for inter-RAT configuration of the LTE;

a cell that provides cross-carrier configuration of the LTE V2X, provides inter-RAT configuration of the NR V2X, and provides multiple resource allocation modes for inter-RAT configuration of the NR;

a cell that provides cross-carrier configuration of the LTE V2X, provides inter-RAT configuration of the NR V2X, and provides only one resource allocation mode for inter-RAT configuration of the NR.

Solution III: a possible priority of cell selection may be arranged in the following order (that is, the higher the priority is in the front):

a cell that provides the LTE V2X and NR V2X;

a cell that provides the NR V2X;

a cell that provides the LTE V2X;

a cell that provides cross-carrier configuration of the LTE V2X and the NR V2X;

a cell that provides cross-carrier configuration of the NR V2X;

a cell that provides cross-carrier configuration of the LTE V2X;

a cell that provides inter-RAT configuration of the NR V2X, and provides multiple resource allocation modes for inter-RAT configuration of the NR;

a cell that provides inter-RAT configuration of the NR V2X, and provides only one resource allocation mode for inter-RAT configuration of the NR;

a cell that provides inter-RAT configuration of the LTE V2X, and provides multiple resource allocation modes for inter-RAT configuration of the LTE;

a cell that provides inter-RAT configuration of the LTE V2X, and provides only one resource allocation mode for inter-RAT configuration of the LTE;

a cell that provides cross-carrier configuration of the NR V2X, provides inter-RAT configuration of the LTE V2X, and provides multiple resource allocation modes for inter-RAT configuration of the LTE;

a cell that provides cross-carrier configuration of the NR V2X, provides inter-RAT configuration of the LTE V2X, and provides only one resource allocation mode for inter-RAT configuration of the LTE;

a cell that provides cross-carrier configuration of the LTE V2X, provides inter-RAT configuration of the NR V2X, and provides multiple resource allocation modes for inter-RAT configuration of the NR;

a cell that provides cross-carrier configuration of the LTE V2X, provides inter-RAT configuration of the NR V2X, and provides only one resource allocation mode for inter-RAT configuration of the NR;

a cell that provides the NR V2X, provides inter-RAT configuration of the LTE V2X, and provides multiple resource allocation modes for inter-RAT configuration of the LTE;

a cell that provides the NR V2X, provides inter-RAT configuration of the LTE V2X, and provides only one resource allocation mode for inter-RAT configuration of the LTE;

a cell that provides the LTE V2X, provides inter-RAT configuration of the NR V2X, and provides multiple resource allocation modes for inter-RAT configuration of the NR;

a cell that provides the LTE V2X, provides inter-RAT configuration of the NR V2X, and provides only one resource allocation mode for inter-RAT configuration of the NR.

It should be noted that the above three solutions are for purposes of example only. In addition, in the above three solutions, in actual applications, they may not include all the cells listed above, but may include some of the cells listed above. The priority order of these cells is still in accordance with the above arrangement, that is, the higher the priority is in the front, or the priorities of some cells can also be the same.

In the embodiments of the present disclosure, a terminal receives a broadcast message sent by a network device, where the broadcast message is used to indicate at least one of: whether the network device supports inter-RAT configuration, a mode of inter-RAT configuration supported by the network device, and a resource location of the inter-RAT configuration supported by the network device; and the terminal performs cell selection according to the broadcast message, and the cell selection includes a cell initial selection or a cell reselection. In this way, the terminal can select a cell according to the RAT configuration, so that a cell that better meets the needs of the terminal can be selected to improve the communication performance of the terminal.

Please refer to FIG. 3, FIG. 3 is a flowchart of a broadcast message sending method according to an embodiment of the present disclosure, as shown in FIG. 3, the method includes the following steps:

301, sending, by a network device, a broadcast message to a terminal, where the broadcast message is used to indicate at least one of: whether the network device supports an inter-RAT configuration, a mode of inter-RAT configuration supported by the network device, and a resource location of the inter-RAT configuration supported by the network device;

It should be noted that the above-mentioned terminal in this embodiment may be a terminal in any implementation in the method embodiments of the embodiments of the disclosure, and any implementation of the terminal in the method embodiments of the embodiments of the disclosure may be realized by the above-mentioned terminal and achieves the same beneficial effects, and will not be repeated here.

Referring to FIG. 4, the following three embodiments are used to illustrate the method provided in the embodiments of the present disclosure:

Embodiment I

In this embodiment, when the terminal device only supports the LTE V2X service, cell selection/reselection is performed The flow diagram of this embodiment is shown in FIG. 4, and each step in the above flowchart is described as follows:

1. the network device sends broadcast information (the terminal receives the broadcast message sent by the network device)

specifically, the broadcast message includes one or more of the following fields:

Option 1: a field indicating whether inter-RAT configuration is supported;

For example, this field is N bits, and N is a positive integer greater than or equal to 1. Specifically, it can be 1 bit, and when the value is 0, it means inter-RAT configuration is not supported, and when it is 1, it means inter-RAT configuration is supported.

Option 2: a field indicating a resource allocation mode of the inter-RAT configuration;

for example, this field is M bits, M is a positive integer greater than or equal to 1, specifically, it can be 2 bits. When the value is 11, it means that all resource allocation modes are supported. When the value is 01 or 10, it means that only one of the resource allocation modes is supported, for example, 01 means that only a resource allocation mode selected by the terminal is supported, 10 means that only a resource allocation mode scheduled by the network is supported, and when the value is 00, it means that no resource allocation mode of the inter-RAT configuration is supported, which means that the inter-RAT configuration is not supported.

Option 3: a field indicating the resource location of the inter-RAT configuration;

This field indicates the resource location of another RAT of the inter-RAT configuration. For example, a base station of NR indicates a location of an LTE V2X resource (for example: resource pool configuration, etc.). If this field exists, it indicates that the inter-RAT configuration is supported, and a specific supported allocation mode can be specifically indicated or it is defaulted that only a resource allocation mode selected by the terminal is supported, because this field has been configured with a relevant resource pool location. If this field does not exist, it indicates that the inter-RAT configuration is not supported, that is, it is implicitly indicated that the inter-RAT configuration is not supported.

2. The terminal performs cell selection according to the broadcast message.

This step is illustrated by taking the following priority order as an example. Other priority orders may refer to the corresponding description of this priority order, and will not be repeated:

i. a cell that provides the LTE V2X service;

ii. a cell that provides the LTE V2X service of the cross-carrier configuration;

iii. a cell that provides the NR V2X service, provides the LTE V2X service of the inter-RAT configuration, and provides LTE mode3 and mode4 of the inter-RAT configuration (regardless of whether it supports cross-carrier configuration), or a cell provides the LTE V2X service of the inter-RAT configuration, and provides LTE mode3 and mode4 of the inter-RAT configuration (regardless of whether it supports the NR V2X service);

iv. a cell that provides the NR V2X service, provides the LTE V2X service of the inter-RAT configuration, and only provides LTE mode3 or LTE mode4 of the inter-RAT configuration (regardless of whether it supports cross-carrier configuration), or a cell provides the LTE V2X service of the inter-RAT configuration, and only provides LTE mode3 or LTE mode4 of the inter-RAT configuration (regardless of whether it supports the NR V2X service).

Details are as follows:

a cell that provides the LTE V2X service is preferably selected;

If there are multiple cells meeting conditions, the terminal device selects the cell with the strongest signal strength, or randomly selects one cell, or selecting which cell belongs to the terminal device implementation, the same hereinafter.

If the above-mentioned cell is not searched, according to the broadcast message, a cell that provides the LTE V2X service of the cross-carrier configuration is selected;

If the above-mentioned cell is not searched, according to the broadcast message, a cell that provides the NR V2X service, provides the LTE V2X service of the inter-RAT configuration, and provides LTE mode3 and mode4 of the inter-RAT configuration (regardless of whether it supports cross-carrier configuration) is selected, or a cell provides the LTE V2X service of the inter-RAT configuration, and provides LTE mode3 and mode4 of the inter-RAT configuration (regardless of whether it supports the NR V2X service) is selected;

If the above-mentioned cell is not searched, according to the broadcast message, a cell that provides the NR V2X service, provides the LTE V2X service of the inter-RAT configuration, and provides LTE mode3 and mode4 of the inter-RAT configuration (regardless of whether it supports cross-carrier configuration) is selected, or a cell provides the LTE V2X service of the inter-RAT configuration, and provides LTE mode3 and mode4 of the inter-RAT configuration (regardless of whether it supports the NR V2X service) is selected.

If none of the above-mentioned cells meeting conditions are searched, the terminal is considered to be outside the coverage of the cell, and the terminal uses a pre-configured resource pool to select resources according to pre-configured information to perform the V2X service.

Embodiment II

When the terminal device only supports the NR V2X service, cell selection/reselection is performed The flow diagram of this embodiment is also as shown in FIG. 4, and each step in the above flowchart is described as follows:

1. the network device sends broadcast information (the terminal device receives the broadcast message sent by the network device)

specifically, the broadcast message includes one or more of the following fields:

Option 1: a field indicating whether inter-RAT configuration is supported;

For example, this field is N bits, and N is a positive integer greater than or equal to 1. Specifically, it can be 1 bit, and when the value is 0, it means inter-RAT configuration is not supported, and when it is 1, it means inter-RAT configuration is supported.

Option 2: a field indicating a resource allocation mode of the inter-RAT configuration;

for example, this field is M bits, M is a positive integer greater than or equal to 1, specifically, it can be 2 bits. When the value is 11, it means that all resource allocation modes are supported. When the value is 01 or 10, it means that only one of the resource allocation modes is supported, for example, 01 means that only a resource allocation mode selected by the terminal is supported, 10 means that only a resource allocation mode scheduled by the network is supported, and when the value is 00, it means that no resource allocation mode of the inter-RAT configuration is supported, which means that the inter-RAT configuration is not supported.

Option 3: a field indicating the resource location of the inter-RAT configuration;

This field indicates the resource location of another RAT of the inter-RAT configuration. For example, a base station of NR indicates a location of an LTE V2X resource (for example: resource pool configuration, etc.). If this field exists, it indicates that the inter-RAT configuration is supported, and a specific supported allocation mode can be specifically indicated or it is defaulted that only a resource allocation mode selected by the terminal is supported, because this field has been configured with a relevant resource pool location. If this field does not exist, it indicates that the inter-RAT configuration is not supported, that is, it is implicitly indicated that the inter-RAT configuration is not supported.

2. The terminal performs cell selection according to the broadcast message.

This step is illustrated by taking the following priority order as an example. Other priority orders may refer to the corresponding description of this priority order, and will not be repeated:

i. a cell that provides the NR V2X service;

ii. a cell that provides the NR V2X service of the cross-carrier configuration;

iii. a cell that provides the LTE V2X service, provides the NR V2X service of the inter-RAT configuration, and provides NR mode 1 and mode 2 of the inter-RAT configuration (regardless of whether it supports cross-carrier configuration), or a cell that provides the NR V2X service of the inter-RAT configuration, and provides NR mode 1 and mode 2 of the inter-RAT configuration (regardless of whether it supports the LTE V2X service);

iv. a cell that provides the LTE V2X service, provides the NR V2X service of the inter-RAT configuration, and provides NR mode 1 or NR mode 2 of the inter-RAT configuration (regardless of whether it supports cross-carrier configuration), or a cell that provides the NR V2X service of the inter-RAT configuration, and only provides NR mode 1 or NR mode 2 of the inter-RAT configuration (regardless of whether it supports the LTE V2X service).

According to the broadcast message, a cell that provides the LTE V2X service is preferably selected;

If there are multiple cells meeting conditions, the terminal device selects the cell with the strongest signal strength, or randomly selects one cell, or selecting which cell belongs to the terminal device implementation, the same hereinafter.

If the above-mentioned cell is not searched, according to the broadcast message, a cell that provides the NR V2X service of the cross-carrier configuration is selected;

If the above-mentioned cell is not searched, according to the broadcast message, a cell that provides the LTE V2X service, provides the NR V2X service of the inter-RAT configuration, and provides NR mode1 and mode2 of the inter-RAT configuration (regardless of whether it supports cross-carrier configuration) is selected, or a cell that provides the NR V2X service of the inter-RAT configuration, and provides NR mode 1 and mode 2 of the inter-RAT configuration (regardless of whether it supports the LTE V2X service) is selected;

If the above-mentioned cell is not searched, according to the broadcast message, a cell that provides the LTE V2X service, provides the NR V2X service of the inter-RAT configuration, and provides NR mode 1 or NR mode 2 of the inter-RAT configuration (regardless of whether it supports cross-carrier configuration) is selected, or a cell that provides the NR V2X service of the inter-RAT configuration, and only provides NR mode 1 or NR mode 2 of the inter-RAT configuration (regardless of whether it supports the LTE V2X service) is selected;

If none of the above-mentioned cells meeting conditions are searched, the terminal is considered to be outside the coverage of the cell, and the terminal uses a pre-configured resource pool to select resources according to pre-configured information to perform the V2X service

Embodiment III

When the terminal device supports the V2X service and the NR V2X service, i.e., the two services are both supported, the cell selection/reselection is performed The flow diagram of this embodiment is also as shown in FIG. 4, and each step in the above flowchart is described as follows:

1. the network device sends broadcast information (the terminal device receives the broadcast message sent by the network device)

specifically, the broadcast message includes one or more of the following fields:

Option 1: a field indicating whether inter-RAT configuration is supported;

For example, this field is N bits, and N is a positive integer greater than or equal to 1. Specifically, it can be 1 bit, and when the value is 0, it means inter-RAT configuration is not supported, and when it is 1, it means inter-RAT configuration is supported.

Option 2: a field indicating a resource allocation mode of the inter-RAT configuration;

for example, this field is M bits, M is a positive integer greater than or equal to 1, specifically, it can be 2 bits. When the value is 11, it means that all resource allocation modes are supported. When the value is 01 or 10, it means that only one of the resource allocation modes is supported, for example, 01 means that only a resource allocation mode selected by the terminal is supported, 10 means that only a resource allocation mode scheduled by the network is supported, and when the value is 00, it means that no resource allocation mode of the inter-RAT configuration is supported, which means that the inter-RAT configuration is not supported.

Option 3: a field indicating the resource location of the inter-RAT configuration;

This field indicates the resource location of another RAT of the inter-RAT configuration. For example, a base station of NR indicates a location of an LTE V2X resource (for example: resource pool configuration, etc.). If this field exists, it indicates that the inter-RAT configuration is supported, and a specific supported allocation mode can be specifically indicated or it is defaulted that only a resource allocation mode selected by the terminal is supported, because this field has been configured with a relevant resource pool location. If this field does not exist, it indicates that the inter-RAT configuration is not supported, that is, it is implicitly indicated that the inter-RAT configuration is not supported.

2. The terminal performs cell selection according to the broadcast message.

This step is illustrated by taking the following priority order as an example. Other priority orders may refer to the corresponding description of this priority order, and will not be repeated:

a cell that provides the LTE V2X and NR V2X;

a cell that provides the LTE V2X;

a cell that provides the NR V2X;

a cell that provides cross-carrier configuration of the LTE V2X and the NR V2X;

a cell that provides cross-carrier configuration of the LTE V2X;

a cell that provides cross-carrier configuration of the NR V2X;

a cell that provides inter-RAT configuration of the LTE V2X, and provides multiple resource allocation modes for inter-RAT configuration of the LTE;

a cell that provides inter-RAT configuration of the LTE V2X, and provides only one resource allocation mode for inter-RAT configuration of the LTE;

a cell that provides inter-RAT configuration of the NR V2X, and provides multiple resource allocation modes for inter-RAT configuration of the NR;

a cell that provides inter-RAT configuration of the NR V2X, and provides only one resource allocation mode for inter-RAT configuration of the NR;

a cell that provides the LTE V2X, provides inter-RAT configuration of the NR V2X, and provides multiple resource allocation modes for inter-RAT configuration of the NR;

a cell that provides the LTE V2X, provides inter-RAT configuration of the NR V2X, and provides only one resource allocation mode for inter-RAT configuration of the NR;

a cell that provides the NR V2X, provides inter-RAT configuration of the LTE V2X, and provides multiple resource allocation modes for inter-RAT configuration of the LTE;

a cell that provides the NR V2X, provides inter-RAT configuration of the LTE V2X, and provides only one resource allocation mode for inter-RAT configuration of the LTE;

a cell that provides cross-carrier configuration of the LTE V2X, provides inter-RAT configuration of the NR V2X, and provides multiple resource allocation modes for inter-RAT configuration of the NR;

a cell that provides cross-carrier configuration of the LTE V2X, provides inter-RAT configuration of the NR V2X, and provides only one resource allocation mode for inter-RAT configuration of the NR;

a cell that provides cross-carrier configuration of the NR V2X, provides inter-RAT configuration of the LTE V2X, and provides multiple resource allocation modes for inter-RAT configuration of the LTE;

a cell that provides cross-carrier configuration of the NR V2X, provides inter-RAT configuration of the LTE V2X, and provides only one resource allocation mode for inter-RAT configuration of the LTE;

According to the broadcast message, a cell that provides the LTE V2X and the NR V2X is preferably selected;

If there are multiple cells meeting conditions, the terminal device selects the cell with the strongest signal strength, or randomly selects one cell, or selecting which cell belongs to the terminal device implementation, the same hereinafter.

If the above-mentioned cell is not searched, according to the broadcast message, a cell that provides the LTE V2X is selected;

If the above-mentioned cell is not searched, according to the broadcast message, a cell that provides the NR V2X is selected;

If the above-mentioned cell is not searched, according to the broadcast message, a cell that provides cross-carrier configuration of the LTE V2X and the NR V2X is selected;

If the above-mentioned cell is not searched, according to the broadcast message, a cell that provides cross-carrier configuration of the LTE V2X is selected;

If the above-mentioned cell is not searched, according to the broadcast message, a cell that provides cross-carrier configuration of the NR V2X is selected;

If the above-mentioned cell is not searched, according to the broadcast message, a cell that provides inter-RAT configuration of the LTE V2X, and provides multiple resource allocation modes for inter-RAT configuration of the LTE is selected;

If the above-mentioned cell is not searched, according to the broadcast message, a cell that provides inter-RAT configuration of the LTE V2X, and provides only one resource allocation mode for inter-RAT configuration of the LTE is selected;

If the above-mentioned cell is not searched, according to the broadcast message, a cell that provides inter-RAT configuration of the NR V2X, and provides multiple resource allocation modes for inter-RAT configuration of the NR is selected;

If the above-mentioned cell is not searched, according to the broadcast message, a cell that provides inter-RAT configuration of the NR V2X, and provides only one resource allocation mode for inter-RAT configuration of the NR is selected;

If the above-mentioned cell is not searched, according to the broadcast message, a cell that provides the LTE V2X, provides inter-RAT configuration of the NR V2X, and provides multiple resource allocation modes for inter-RAT configuration of the NR is selected;

If the above-mentioned cell is not searched, according to the broadcast message, a cell that provides the LTE V2X, provides inter-RAT configuration of the NR V2X, and provides only one resource allocation mode for inter-RAT configuration of the NR is selected;

If the above-mentioned cell is not searched, according to the broadcast message, a cell that provides the NR V2X, provides inter-RAT configuration of the LTE V2X, and provides multiple resource allocation modes for inter-RAT configuration of the LTE is selected;

If the above-mentioned cell is not searched, according to the broadcast message, a cell that provides the NR V2X, provides inter-RAT configuration of the LTE V2X, and provides only one resource allocation mode for inter-RAT configuration of the LTE is selected;

If the above-mentioned cell is not searched, according to the broadcast message, a cell that provides cross-carrier configuration of the LTE V2X, provides inter-RAT configuration of the NR V2X, and provides multiple resource allocation modes for inter-RAT configuration of the NR is selected;

If the above-mentioned cell is not searched, according to the broadcast message, a cell that provides cross-carrier configuration of the LTE V2X, provides inter-RAT configuration of the NR V2X, and provides only one resource allocation mode for inter-RAT configuration of the NR is selected;

If the above-mentioned cell is not searched, according to the broadcast message, a cell that provides cross-carrier configuration of the NR V2X, provides inter-RAT configuration of the LTE V2X, and provides multiple resource allocation modes for inter-RAT configuration of the LTE is selected;

If the above-mentioned cell is not searched, according to the broadcast message, a cell that provides cross-carrier configuration of the NR V2X, provides inter-RAT configuration of the LTE V2X, and provides only one resource allocation mode for inter-RAT configuration of the LTE is selected;

If none of the above-mentioned cells meeting conditions are searched, the terminal is considered to be outside the coverage of the cell, and the terminal uses a pre-configured resource pool to select resources according to pre-configured information to perform the V2X service.

Figure 5:
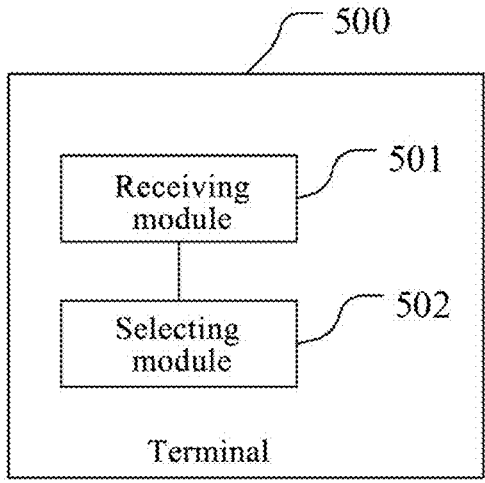
FIG. 5 is a structural view of a terminal according to an embodiment of the present disclosure.

Please refer to FIG. 5, FIG. 5 is a structural view of a terminal according to an embodiment of the present disclosure, as shown in FIG. 5, the terminal 500 includes:

a receiving module 501, configured to receive a broadcast message sent by a network device, where the broadcast message is used to indicate at least one of: whether the network device supports inter-radio access technology (RAT) configuration, a mode of inter-RAT configuration supported by the network device, and a resource location of the inter-RAT configuration supported by the network device;

a selecting module 502, configured to perform cell selection according to the broadcast message, and the cell selection includes a cell initial selection or a cell reselection.

Optionally, the selecting module 502 is configured to perform cell selection according to the broadcast message based on a cell priority order.

Optionally, the performing, by the terminal, cell selection according to the broadcast message includes:

performing, by the terminal, cell selection according to the broadcast message based on the priority order of the cell.

Optionally, a cell priority order includes: a first cell priority order or a second cell priority order.

Optionally, if the terminal only supports a service of a first system, the cell priority order is a first cell priority order; or, if a current service of the terminal is the service of the first system, the cell priority order is the first cell priority order; or, if the terminal supports the service of the first system and a service of a second system, the cell priority order is a second cell priority order; or, if the current service of the terminal includes the service of the first system and the service of the second system, the cell priority order is the second cell priority order.

Optionally, the first system is an LTE system, and the second system is an NR system.

the first system is an NR system, and the second system is an LTE system.

Optionally, the service is a V2X service.

Optionally, the first cell priority order includes at least two of the following cells:

a first cell, a second cell, a third cell, and a fourth cell;

where, a priority of the first cell is higher than a priority of the second cell, a priority of the third cell and a priority of the fourth cell, and the priority of the second cell is higher than or equal to the priority of the third cell and the priority of the fourth cell, the priority of the third cell is higher than or equal to the priority of the fourth cell;

the first cell is a cell that provides the service of the first system;

the second cell is a cell that provides a service for cross-carrier configuration of the first system;

the third cell is a cell that provides a service of the second system and provides an inter-RAT configuration, and provides multiple resource allocation modes for inter-RAT configuration of the first system, or the third cell is a cell that provides a service for inter-RAT configuration of the first system, and provides multiple resource allocation modes for inter-RAT configuration of the first system;

the fourth cell is a cell that provides a service of the second system and provides an inter-RAT configuration, and provides only one resource allocation mode for inter-RAT configuration of the first system, or the fourth cell is a cell that provides a service for inter-RAT configuration of the first system, and provides one resource allocation mode for inter-RAT configuration of the first system;

or, the first cell is a cell that provides the service of the first system;

the second cell is a cell that provides a service of the second system and provides an inter-RAT configuration, and provides multiple resource allocation modes for inter-RAT configuration of the first system, or, the second cell is a cell that provides a service for inter-RAT configuration of the first system, and provides multiple resource allocation modes for inter-RAT configuration of the first system;

the third cell is a cell that provides a service for cross-carrier configuration of the first system;

the fourth cell is a cell that provides a service of the second system and provides an inter-RAT configuration, and provides only one resource allocation mode for inter-RAT configuration of the first system, or, the fourth cell is a cell that provides a service for inter-RAT configuration of the first system, and provides only one resource allocation mode for inter-RAT configuration of the first system;

Optionally, a priority of a fifth cell is higher that a priority of a sixth cell in the second cell priority order.

where, a priority order of at least one cell included in the fifth cell is specified by a standard, or configured by a network device, or pre-configured;

a priority order of at least one cell included in the sixth cell is specified by a standard, or configured by a network device, or pre-configured;

Optionally, the fifth cell includes at least one of the following:

a cell that provides the services of the first system and the second system;

a cell that provides the service of the first system;

a cell that provides the service of the second system.

Optionally, the sixth cell includes at least one of the following:

a cell that provides the services for cross-carrier configuration of the first system and the second system;

a cell that provides a service for cross-carrier configuration of the first system;

a cell that provides a service for cross-carrier configuration of the second system;

a cell that provides a service for inter-RAT configuration of the first system, and provides multiple resource allocation modes for inter-RAT configuration of the first system;

a cell that provides a service for inter-RAT configuration of the first system, and provides only one resource allocation mode for inter-RAT configuration of the first system;

a cell that provides a service for inter-RAT configuration of the second system, and provides multiple resource allocation modes for inter-RAT configuration of the second system;

a cell that provides a service for inter-RAT configuration of the second system, and provides only one resource allocation mode for inter-RAT configuration of the second system;

a cell that provides a service of the first system, provides a service for inter-RAT configuration of the second system, and provides multiple resource allocation modes for inter-RAT configuration of the second system;

a cell that provides a service of the first system, provides a service for inter-RAT configuration of the second system, and provides only one resource allocation mode for inter-RAT configuration of the second system;

a cell that provides a service of the second system, provides a service for inter-RAT configuration of the first system, and provides multiple resource allocation modes for inter-RAT configuration of the first system;

a cell that provides a service of the second system, provides a service for inter-RAT configuration of the first system, and provides only one resource allocation mode for inter-RAT configuration of the first system;

a cell that provides a service for cross-carrier configuration of the first system, provides a service for inter-RAT configuration of the second system, and provides multiple resource allocation modes for inter-RAT configuration of the second system;

a cell that provides a service for cross-carrier configuration of the first system, provides a service for inter-RAT configuration of the second system, and provides only one resource allocation mode for inter-RAT configuration of the second system;

a cell that provides a service for cross-carrier configuration of the second system, provides a service for inter-RAT configuration of the first system, and provides multiple resource allocation modes for inter-RAT configuration of the first system;

a cell that provides a service for cross-carrier configuration of the second system, provides a service for inter-RAT configuration of the first system, and provides only one resource allocation mode for inter-RAT configuration of the first system;

Optionally, if the cell priority order includes a priority having multiple cells, the terminal selects a cell with a strongest signal strength among the multiple cells, or randomly selects a cell.

Optionally, according to the priority order of the cells, if there is no selectable cell, the terminal uses a pre-configured resource to perform services.

It should be noted that the above-mentioned terminal in this embodiment may be a terminal in any implementation in the method embodiments of the embodiments of the disclosure, and any implementation of the terminal in the method embodiments of the embodiments of the disclosure may be realized by the above-mentioned terminal and achieves the same beneficial effects, and will not be repeated here.

Please refer to FIG. 5, FIG. 5 is a structural view of a network device according to an embodiment of the present disclosure, as shown in FIG. 5, the network device 500 includes:

a sending module 501, configured to send a broadcast message to a terminal, where the broadcast message is used to indicate at least one of: whether the network device supports an inter-RAT configuration, a mode of inter-RAT configuration supported by the network device, and a resource location of the inter-RAT configuration supported by the network device;

It should be noted that the above-mentioned network device in this embodiment may be a network device in any implementation in the method embodiments of the embodiments of the disclosure, and any implementation of the network device in the method embodiments of the embodiments of the disclosure may be realized by the above-mentioned network device and achieves the same beneficial effects, and will not be repeated here.

Figure 6:
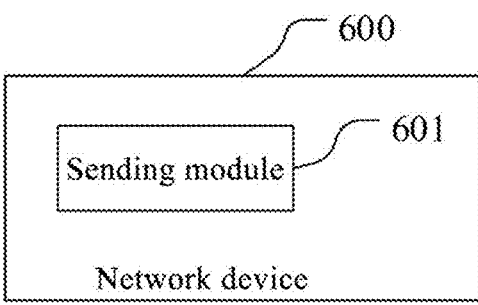
FIG. 6 is a structural view of a network device according to an embodiment of the present disclosure.

Please refer to FIG. 6, FIG. 6 is a structural view of another terminal according to an embodiment of the present disclosure, as shown in FIG. 6, the terminal includes: a transceiver 610, a memory 620, a processor 600, and a program stored on the memory 620 and executable on the processor, among them:

the transceiver 610 is configured to receive a broadcast message sent by a network device, where the broadcast message is used to indicate at least one of: whether the network device supports inter-RAT configuration, a mode of inter-RAT configuration supported by the network device, and a resource location of the inter-RAT configuration supported by the network device; and is configured to perform cell selection according to the broadcast message, and the cell selection includes a cell initial selection or a cell reselection;

or, the transceiver 610 is configured to receive a broadcast message sent by a network device, where the broadcast message is used to indicate at least one of: whether the network device supports inter-RAT configuration, a mode of inter-RAT configuration supported by the network device, and a resource location of the inter-RAT configuration supported by the network device;

the processor 600 is configured to perform cell selection according to the broadcast message 600, and the cell selection includes a cell initial selection or a cell reselection.

Where the transceiver 610 may be used for signal reception and transmission under control of the processor 600.

In FIG. 6, a bus architecture may include any quantity of interconnected buses and bridges, which are specifically connected together by various circuits of one or more processors represented by the processor 600 and a memory represented by the memory 620. The bus architecture may further connect together various other circuits of a peripheral device, a voltage stabilizer, a power management circuit, and the like, which are known in this art and will not be further described herein. The bus interface provides an interface. The transceiver 602 can include a plurality of elements, namely a transmitter and a receiver, providing units in communication with various other devices on the transmission medium.

The processor 600 is responsible for management of the bus architecture and general processing. The memory 620 may store data used by the processor 600 when operations are performed.

It should be noted that the memory 620 is not limited to being only on the terminal, and the memory 620 and the processor 600 may be separated in different geographic locations.

Optionally, the performing cell selection according to the broadcast message includes:

performing, by the terminal, cell selection according to the broadcast message based on the priority order of the cell.

Optionally, a cell priority order includes: a first cell priority order or a second cell priority order.

Optionally, if the terminal only supports a service of a first system, the cell priority order is a first cell priority order; or, if a current service of the terminal is the service of the first system, the cell priority order is the first cell priority order; or, if the terminal supports the service of the first system and a service of a second system, the cell priority order is a second cell priority order; or, if the current service of the terminal includes the service of the first system and the service of the second system, the cell priority order is the second cell priority order.

Optionally, the first system is an LTE system, and the second system is an NR system.

the first system is an NR system, and the second system is an LTE system.

Optionally, the service is a V2X service.

Optionally, the first cell priority order includes at least two of the following cells:

a first cell, a second cell, a third cell, and a fourth cell;

where, a priority of the first cell is higher than a priority of the second cell, a priority of the third cell and a priority of the fourth cell, and the priority of the second cell is higher than or equal to the priority of the third cell and the priority of the fourth cell, the priority of the third cell is higher than or equal to the priority of the fourth cell;

the first cell is a cell that provides the service of the first system;

the second cell is a cell that provides a service for cross-carrier configuration of the first system;

the third cell is a cell that provides a service of the second system and provides an inter-RAT configuration, and provides multiple resource allocation modes for inter-RAT configuration of the first system, or the third cell is a cell that provides a service for inter-RAT configuration of the first system, and provides multiple resource allocation modes for inter-RAT configuration of the first system;

the fourth cell is a cell that provides a service of the second system and provides an inter-RAT configuration, and provides only one resource allocation mode for inter-RAT configuration of the first system, or the fourth cell is a cell that provides a service for inter-RAT configuration of the first system, and provides one resource allocation mode for inter-RAT configuration of the first system;

or, the first cell is a cell that provides the service of the first system;

the second cell is a cell that provides a service of the second system and provides an inter-RAT configuration, and provides multiple resource allocation modes for inter-RAT configuration of the first system, or, the second cell is a cell that provides a service for inter-RAT configuration of the first system, and provides multiple resource allocation modes for inter-RAT configuration of the first system;

the third cell is a cell that provides a service for cross-carrier configuration of the first system;

the fourth cell is a cell that provides a service of the second system and provides an inter-RAT configuration, and provides only one resource allocation mode for inter-RAT configuration of the first system, or, the fourth cell is a cell that provides a service for inter-RAT configuration of the first system, and provides only one resource allocation mode for inter-RAT configuration of the first system;

Optionally, a priority of a fifth cell is higher that a priority of a sixth cell in the second cell priority order.

where, a priority order of at least one cell included in the fifth cell is specified by a standard, or configured by a network device, or pre-configured;

a priority order of at least one cell included in the sixth cell is specified by a standard, or configured by a network device, or pre-configured;

Optionally, the fifth cell includes at least one of the following:

a cell that provides the services of the first system and the second system;

a cell that provides the service of the first system;

a cell that provides the service of the second system.

Optionally, the sixth cell includes at least one of the following:

a cell that provides the services for cross-carrier configuration of the first system and the second system;

a cell that provides a service for cross-carrier configuration of the first system;

a cell that provides a service for cross-carrier configuration of the second system;

a cell that provides a service for inter-RAT configuration of the first system, and provides multiple resource allocation modes for inter-RAT configuration of the first system;

a cell that provides a service for inter-RAT configuration of the first system, and provides only one resource allocation mode for inter-RAT configuration of the first system;

a cell that provides a service for inter-RAT configuration of the second system, and provides multiple resource allocation modes for inter-RAT configuration of the second system;

a cell that provides a service for inter-RAT configuration of the second system, and provides only one resource allocation mode for inter-RAT configuration of the second system;

a cell that provides a service of the first system, provides a service for inter-RAT configuration of the second system, and provides multiple resource allocation modes for inter-RAT configuration of the second system;

a cell that provides a service of the first system, provides a service for inter-RAT configuration of the second system, and provides only one resource allocation mode for inter-RAT configuration of the second system;

a cell that provides a service of the second system, provides a service for inter-RAT configuration of the first system, and provides multiple resource allocation modes for inter-RAT configuration of the first system;

a cell that provides a service of the second system, provides a service for inter-RAT configuration of the first system, and provides only one resource allocation mode for inter-RAT configuration of the first system;

a cell that provides a service for cross-carrier configuration of the first system, provides a service for inter-RAT configuration of the second system, and provides multiple resource allocation modes for inter-RAT configuration of the second system;

a cell that provides a service for cross-carrier configuration of the first system, provides a service for inter-RAT configuration of the second system, and provides only one resource allocation mode for inter-RAT configuration of the second system;

a cell that provides a service for cross-carrier configuration of the second system, provides a service for inter-RAT configuration of the first system, and provides multiple resource allocation modes for inter-RAT configuration of the first system;

a cell that provides a service for cross-carrier configuration of the second system, provides a service for inter-RAT configuration of the first system, and provides only one resource allocation mode for inter-RAT configuration of the first system;

Optionally, if the cell priority order includes a priority having multiple cells, the terminal selects a cell with a strongest signal strength among the multiple cells, or randomly selects a cell.

Optionally, according to the priority order of the cells, if there is no selectable cell, the terminal uses a pre-configured resource to perform services.

It should be noted that the above-mentioned terminal in this embodiment may be a terminal in any implementation in the method embodiments of the embodiments of the disclosure, and any implementation of the terminal in the method embodiments of the embodiments of the disclosure may be realized by the above-mentioned terminal and achieves the same beneficial effects, and will not be repeated here.

Figure 7:
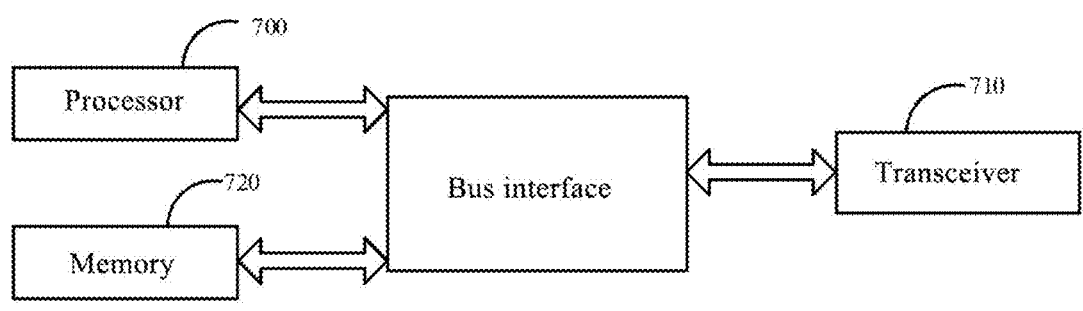
FIG. 7 is a structural view of another terminal according to an embodiment of the present disclosure.
Figure 8:
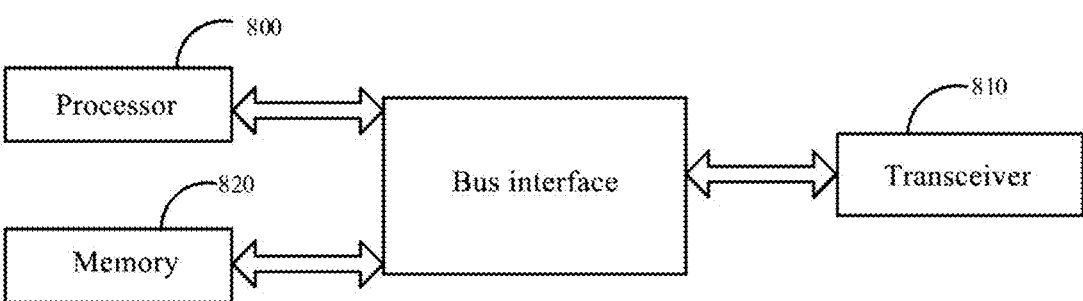
FIG. 8 is a structural view of another network device according to an embodiment of the present disclosure.

Please refer to FIG. 7, FIG. 7 is a structural view of another network device according to an embodiment of the present disclosure, as shown in FIG. 7, the network device includes: a transceiver 710, a memory 720, a processor 700, and a program stored on the memory 720 and executable on the processor, among them:

the transceiver 710 is configured to send a broadcast message to a terminal, where the broadcast message is used to indicate at least one of: whether the network device supports inter-RAT configuration, a mode of inter-RAT configuration supported by the network device, and a resource location of the inter-RAT configuration supported by the network device;

Where the transceiver 710 may be used for signal reception and transmission under control of the processor 700.

In FIG. 7, a bus architecture may include any quantity of interconnected buses and bridges, which are specifically connected together by various circuits of one or more processors represented by the processor 700 and a memory represented by the memory 720. The bus architecture may further connect together various other circuits of a peripheral device, a voltage stabilizer, a power management circuit, and the like, which are known in this art and will not be further described herein. The bus interface provides an interface. The transceiver 710 can include a plurality of elements, namely a transmitter and a receiver, providing units in communication with various other devices on the transmission medium.

The processor 700 is responsible for management of the bus architecture and general processing. The memory 720 may store data used by the processor 700 when operations are performed.

It should be noted that the memory 720 is not limited to being only on the terminal, and the memory 720 and the processor 700 may be separated in different geographic locations.

It should be noted that the above-mentioned network device in this embodiment may be a network device in any implementation in the method embodiments of the embodiments of the disclosure, and any implementation of the network device in the method embodiments of the embodiments of the disclosure may be realized by the above-mentioned network device and achieves the same beneficial effects, and will not be repeated here.

The embodiments of the present disclosure further provide a computer readable storage medium, and a computer program is stored in the computer readable storage medium, when the computer program is executed by a processor, the steps of the energy saving signal sending method on the terminal side provided by the embodiments of the present disclosure are implemented, or, when the computer program is executed by a processor, the steps of the energy saving signal sending method on the network device side provided by the embodiments of the present disclosure are implemented.

In the several embodiments provided in the present disclosure, it should be understood that the disclosed method and apparatus may be implemented in other manners. For example, the above-described apparatus embodiments are merely illustrative, and for example, the division of the units is only one type of logical functional division, and other divisions may be realized in practice, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

In addition, functional units in the embodiments of the present disclosure may be integrated into one processing unit, or each of the units may exist alone physically, or two or more units are integrated into one unit. The integrated unit may be implemented in a form of hardware, or may also be implemented in a form of hardware plus a software functional unit.

The above integrated unit implemented in the form of a software functional unit may be stored in a computer readable storage medium. The above software functional unit is stored in a storage medium and includes several instructions so that a computer device (which may be a personal computer, a server, or a network device, etc.) to perform some steps of the methods described in various embodiments of the present disclosure. The foregoing storage medium includes various media capable of storing program codes, such as a USB flash drive, a mobile hard disk, a read-only memory (Read-Only Memory, ROM), a random access memory (Random Access Memory, RAM), a magnetic disk, or an optical disc.

The foregoing descriptions are merely optional implementations of the present disclosure. It should be noted that a person of ordinary skill in the art may make several improvements or polishing without departing from the principle of this disclosure and the improvements and polishing shall fall within the protection scope of the present disclosure.

What is claimed is:

1. A cell selection method, comprising:

receiving, by a terminal, a broadcast message sent by a network device, where the broadcast message is used to indicate: whether the network device supports inter-RAT configuration, and a resource location of the inter-RAT configuration supported by the network device;

performing, by the terminal, cell selection according to the broadcast message, and the cell selection comprises a cell initial selection or a cell reselection;

wherein, the performing, by the terminal, cell selection according to the broadcast message comprises:

performing, by the terminal, cell selection according to the broadcast message based on a priority order of the cell, the cell priority order comprises: a first cell priority order or a second cell priority order;

wherein, if a current service of the terminal is the service of the first system, the cell priority order is the first cell priority order; or, if the current service of the terminal comprises the services of the first system and the service of the second system, the cell priority order is the second cell priority order;

wherein, the first system is an LTE system, and the second system is an NR system, the inter-RAT configuration is that LTE resource allocations are configured by NR system; or, the first system is an NR system, and the second system is an LTE system, the inter-RAT configuration is that NR resource allocations are configured by LTE system;

wherein the service is a Vehicle-to-everything V2X service;

wherein the first cell priority order is applied to at least one of the following cells:

a first cell, a second cell, a third cell, and a fourth cell;

where, a priority of the first cell is higher than a priority of the second cell, a priority of the third cell and a priority of the fourth cell, and the priority of the second cell is higher than or equal to the priority of the third cell and the priority of the fourth cell, the priority of the third cell is higher than or equal to the priority of the fourth cell;

the first cell is a cell that provides the service of the first system;

the second cell is a cell that provides a service for cross-carrier configuration of the first system;

the third cell is a cell that provides a service of the second system and provides an inter-RAT configuration, and provides multiple resource allocation modes for inter-RAT configuration of the first system, or the third cell is a cell that provides a service for inter-RAT configuration of the first system, and provides multiple resource allocation modes for inter-RAT configuration of the first system;

the fourth cell is a cell that provides a service of the second system and provides an inter-RAT configuration, and provides one resource allocation mode for inter-RAT configuration of the first system, or the third cell is a cell that provides a service for inter-RAT configuration of the first system, and provides one resource allocation mode for inter-RAT configuration of the first system;

or, the first cell is a cell that provides the service of the first system;

the second cell is a cell that provides a service of the second system and provides an inter-RAT configuration, and provides multiple resource allocation modes for inter-RAT configuration of the first system, or, the second cell is a cell that provides a service for inter-RAT configuration of the first system, and provides multiple resource allocation modes for inter-RAT configuration of the first system;

the third cell is a cell that provides a service for cross-carrier configuration of the first system;

the fourth cell is a cell that provides a service of the second system and provides an inter-RAT configuration, and provides only one resource allocation mode for inter-RAT configuration of the first system, or, the fourth cell is a cell that provides a service for inter-RAT configuration of the first system, and provides only one resource allocation mode for inter-RAT configuration of the first system.

2. The method according to claim 1, wherein, a priority of a fifth cell is higher that a priority of a sixth cell in the second cell priority order, wherein, a priority order of at least one cell comprised in the fifth cell is specified by a standard, or configured by a network device, or pre-configured;

a priority order of at least one cell comprised in the sixth cell is specified by a standard, or configured by a network device, or pre-configured.

3. The method according to claim 2, wherein, the fifth cell comprises at least one of the following:

a cell that provides the services of the first system and the second system;

a cell that provides the service of the first system;

a cell that provides the service of the second system.

4. The method according to claim 2, wherein, the sixth cell comprises at least one of the following:

a cell that provides the services for cross-carrier configuration of the first system and the second system;

a cell that provides a service for cross-carrier configuration of the first system;

a cell that provides a service for cross-carrier configuration of the second system;

a cell that provides a service for inter-RAT configuration of the first system, and provides multiple resource allocation modes for inter-RAT configuration of the first system;

a cell that provides a service for inter-RAT configuration of the first system, and provides only one resource allocation mode for inter-RAT configuration of the first system;

a cell that provides a service for inter-RAT configuration of the second system, and provides multiple resource allocation modes for inter-RAT configuration of the second system;

a cell that provides a service for inter-RAT configuration of the second system, and provides only one resource allocation mode for inter-RAT configuration of the second system;

a cell that provides a service of the first system, provides a service for inter-RAT configuration of the second system, and provides multiple resource allocation modes for inter-RAT configuration of the second system;

a cell that provides a service of the first system, provides a service for inter-RAT configuration of the second system, and provides only one resource allocation mode for inter-RAT configuration of the second system;

a cell that provides a service of the second system, provides a service for inter-RAT configuration of the first system, and provides multiple resource allocation modes for inter-RAT configuration of the first system;

a cell that provides a service of the second system, provides a service for inter-RAT configuration of the first system, and provides only one resource allocation mode for inter-RAT configuration of the first system;

a cell that provides a service for cross-carrier configuration of the first system, provides a service for inter-RAT configuration of the second system, and provides multiple resource allocation modes for inter-RAT configuration of the second system;

a cell that provides a service for cross-carrier configuration of the first system, provides a service for inter-RAT configuration of the second system, and provides only one resource allocation mode for inter-RAT configuration of the second system;

a cell that provides a service for cross-carrier configuration of the second system, provides a service for inter-RAT configuration of the first system, and provides multiple resource allocation modes for inter-RAT configuration of the first system;

a cell that provides a service for cross-carrier configuration of the second system, provides a service for inter-RAT configuration of the first system, and provides only one resource allocation mode for inter-RAT configuration of the first system.

5. The method according to claim 1, wherein, if the cell priority order comprises a priority among multiple cells, the terminal selects a cell with a strongest signal strength among the multiple cells.

6. The method according to claim 1, wherein, according to the priority order of the cells, if there is no selectable cell, the terminal uses a pre-configured resource to perform services.

7. A broadcast message sending method, comprising:

sending, by a network device, a broadcast message to a terminal, where the broadcast message is used to indicate: whether the network device supports an inter-RAT configuration, and a resource location of the inter-RAT configuration supported by the network device;

wherein, the broadcast message is used by the terminal to perform cell selection based on a priority order of the cell, the cell selection comprises a cell initial selection or a cell reselection;

the cell priority order comprises: a first cell priority order or a second cell priority order;

wherein, if a current service of the terminal is the service of the first system, the cell priority order is the first cell priority order; or, if the current service of the terminal comprises the services of the first system and the service of the second system, the cell priority order is the second cell priority order;

wherein, the first system is an LTE system, and the second system is an NR system, the inter-RAT configuration is that LTE resource allocations are configured by NR system; or, the first system is an NR system, and the second system is an LTE system, the inter-RAT configuration is that NR resource allocations are configured by LTE system;

wherein the service is a Vehicle-to-everything V2X service;

wherein the first cell priority order is applied to at least one of the following cells:

a first cell, a second cell, a third cell, and a fourth cell;

where, a priority of the first cell is higher than a priority of the second cell, a priority of the third cell and a priority of the fourth cell, and the priority of the second cell is higher than or equal to the priority of the third cell and the priority of the fourth cell, the priority of the third cell is higher than or equal to the priority of the fourth cell;

the first cell is a cell that provides the service of the first system;

the second cell is a cell that provides a service for cross-carrier configuration of the first system;

the third cell is a cell that provides a service of the second system and provides an inter-RAT configuration, and provides multiple resource allocation modes for inter-RAT configuration of the first system, or the third cell is a cell that provides a service for inter-RAT configuration of the first system, and provides multiple resource allocation modes for inter-RAT configuration of the first system;

the fourth cell is a cell that provides a service of the second system and provides an inter-RAT configuration, and provides one resource allocation mode for inter-RAT configuration of the first system, or the third cell is a cell that provides a service for inter-RAT configuration of the first system, and provides one resource allocation mode for inter-RAT configuration of the first system;

or, the first cell is a cell that provides the service of the first system;

the second cell is a cell that provides a service of the second system and provides an inter-RAT configuration, and provides multiple resource allocation modes for inter-RAT configuration of the first system, or, the second cell is a cell that provides a service for inter-RAT configuration of the first system, and provides multiple resource allocation modes for inter-RAT configuration of the first system;

the third cell is a cell that provides a service for cross-carrier configuration of the first system;

the fourth cell is a cell that provides a service of the second system and provides an inter-RAT configuration, and provides only one resource allocation mode for inter-RAT configuration of the first system, or, the fourth cell is a cell that provides a service for inter-RAT configuration of the first system, and provides only one resource allocation mode for inter-RAT configuration of the first system.

8. A terminal, comprising: a transceiver, a memory, a processor, and a program stored on the memory and executable on the processor, the transceiver is configured to receive a broadcast message sent by a network device, where the broadcast message is used to indicate: whether the network device supports inter-RAT configuration, and a resource location of the inter-RAT configuration supported by the network device; and is configured to perform cell selection according to the broadcast message, and the cell selection comprises a cell initial selection or a cell reselection;

or, the transceiver is configured to receive a broadcast message sent by a network device, where the broadcast message is used to indicate at least one of: whether the network device supports inter-RAT configuration, a mode of inter-RAT configuration supported by the network device, and a resource location of the inter-RAT configuration supported by the network device;

the processer is configured to perform cell selection according to the broadcast message, and the cell selection comprises a cell initial selection or a cell reselection;

wherein, the processer is configured to perform cell selection or cell reselection according to the broadcast message based on the priority order of the cell, the cell priority order comprises: a first cell priority order or a second cell priority order;

wherein, if a current service of the terminal is the service of the first system, the cell priority order is the first cell priority order; or, if the current service of the terminal comprises the services of the first system and the service of the second system, the cell priority order is the second cell priority order;

wherein, the first system is an LTE system, and the second system is an NR system, the inter-RAT configuration is that LTE resource allocations are configured by NR system; or, the first system is an NR system, and the second system is an LTE system, the inter-RAT configuration is that NR resource allocations are configured by LTE system;

wherein the service is a Vehicle-to-everything V2X service;

wherein the first cell priority order is applied to at least one of the following cells:

a first cell, a second cell, a third cell, and a fourth cell;

where, a priority of the first cell is higher than a priority of the second cell, a priority of the third cell and a priority of the fourth cell, and the priority of the second cell is higher than or equal to the priority of the third cell and the priority of the fourth cell, the priority of the third cell is higher than or equal to the priority of the fourth cell;

the first cell is a cell that provides the service of the first system;

the second cell is a cell that provides a service for cross-carrier configuration of the first system;

the third cell is a cell that provides a service of the second system and provides an inter-RAT configuration, and provides multiple resource allocation modes for inter-RAT configuration of the first system, or the third cell is a cell that provides a service for inter-RAT configuration of the first system, and provides multiple resource allocation modes for inter-RAT configuration of the first system;

the fourth cell is a cell that provides a service of the second system and provides an inter-RAT configuration, and provides one resource allocation mode for inter-RAT configuration of the first system, or the third cell is a cell that provides a service for inter-RAT configuration of the first system, and provides one resource allocation mode for inter-RAT configuration of the first system;

or, the first cell is a cell that provides the service of the first system;

the second cell is a cell that provides a service of the second system and provides an inter-RAT configuration, and provides multiple resource allocation modes for inter-RAT configuration of the first system, or, the second cell is a cell that provides a service for inter-RAT configuration of the first system, and provides multiple resource allocation modes for inter-RAT configuration of the first system;

the third cell is a cell that provides a service for cross-carrier configuration of the first system;

the fourth cell is a cell that provides a service of the second system and provides an inter-RAT configuration, and provides only one resource allocation mode for inter-RAT configuration of the first system, or, the fourth cell is a cell that provides a service for inter-RAT configuration of the first system, and provides only one resource allocation mode for inter-RAT configuration of the first system.

9. The terminal according to claim 8, wherein, the performing cell selection according to the broadcast message comprises:

performing cell selection according to the broadcast message based on a cell priority order.

10. The terminal according to claim 9, wherein, if the terminal only supports a service of a first system, the cell priority order is the first cell priority order; or, if a current service of the terminal is the service of the first system, the cell priority order is the first cell priority order; or, if the terminal supports the service of the first system and a service of a second system, the cell priority order is a second cell priority order; or, if the current service of the terminal comprises the service of the first system and the service of the second system, the cell priority order is the second cell priority order.

11. The terminal according to claim 10, wherein, a priority of a fifth cell is higher that a priority of a sixth cell in the second cell priority order, wherein, a priority order of at least one cell comprised in the fifth cell is specified by a standard, or configured by a network device, or pre-configured;

a priority order of at least one cell comprised in the sixth cell is specified by a standard, or configured by a network device, or pre-configured.

12. A network device, comprising: a transceiver, a memory, a processor, and a program stored on the memory and executable on the processor, the computer program is executed by a processor to implement the steps of the broadcast message sending method according to claim 7.

13. A non-transitory computer readable storage medium, wherein a computer program is stored in the computer readable storage medium, the computer program is executed by a processor to implement the steps of the cell selection method according to claim 1.

* * * * *